Sherwood & Babbett,
Turning Regular Forms.
Nº 8,663.
Patented Jan. 13, 1852.
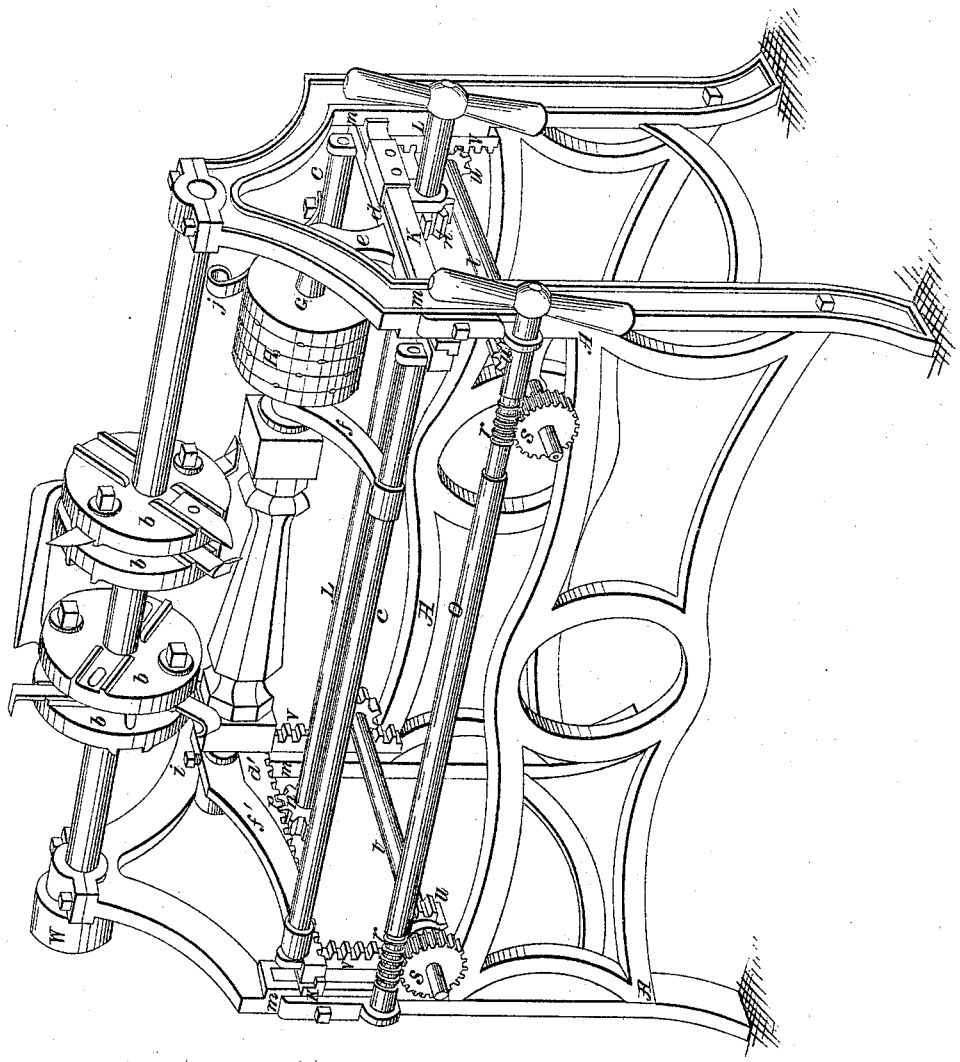

UNITED STATES PATENT OFFICE.

ALLEN SHERWOOD AND AVERY BABBETT, OF AUBURN, NEW YORK.

TURNING PRISMS, &c.

Specification of Letters Patent No. 8,663, dated January 13, 1852.

*To all whom it may concern:*

Be it known that we, ALLEN SHERWOOD and AVERY BABBETT, of Auburn, in the county of Cayuga and State of New York, have invented a new and useful Improvement in Machinery Applicable to the Production of Irregular or of Symmetrical Prismatic Forms, of which the following is a full, clear, and exact description, reference being had to the accompanying drawing, which forms part of this specification and represents a view in perspective of our prismatic lathe.

Our invention consists of a combination of a rotating cutting instrument of peculiar construction with a feed carriage upon which the block to be cut is secured in such manner that its axis is parallel with that of the cutter and which admits of the turning of the block upon its axis to present any of its sides to the action of the cutter; the construction and operation of the feed carriage being such that the block can be moved transversely to the axis of the cutter in any direction, whereby a prismatic figure of regular or irregular form and of varying or invariable diameter can be produced.

In the machine represented in the accompanying drawing A is the frame, the ends of which terminate at their upper extremities in pillow blocks which support the spindle of the cutting instrument. The latter consists of a spindle carrying a series of circular disks or heads $b$ having radial grooves in them in which the various cutters are secured. The cutters are of such form that the edge of each in rotating will describe a figure the outline of which in a plane passing through its axis, is the counterpart of a corresponding line on the side of the required prism, so that the several figures generated by the cutters joined together will leave an outline in a plane taken through their axis the exact counterpart of one of the sides of the prism which they are intended to produce.

The feed carriage is situated beneath the rotating cutter, it is composed mainly of two longitudinal bars $c\ c$, and of the cross pieces $d\ d'$ by which the longitudinal bars are connected. The longitudinal bars are parallel with each other and are fitted with cross heads $f,\ f'$, which support the centers on which the block to be turned is mounted in the usual manner of mounting a block in a lathe. One of these centers is secured to the projecting extremity of a mandrel G, which is arranged to turn in a bearing in the cross-head $f$ and in a corresponding one in a standard $e$ upon the adjacent cross bar $d$. The other center is formed upon the inner extremity of an adjustable mandrel which is supported by the other cross head $f'$, and is constructed to move endwise from and toward the opposite center; it can be clamped in any required position by means of a clamp screw $i$ in the cross head. The mandrel G is fitted with a cylinder H whose barrel is graduated into any required number of divisions, and a spring catch $j$ is secured to the carriage to engage in the divisions of the cylinder and prevent it from turning.

The cross bars of the carriage slide upon ways K K, whose directions are parallel with each other and are transverse to the shaft of the cutting cylinder. These ways are also arranged to slide toward and from the cutting cylinder upon tracks formed on the end plates $m,\ m$, of the frame. The carriage is moved transversely to the cutting cylinder by means of a shaft L, which is supported in boxes secured to the ways K K, and is fitted at its opposite extremities with two equal pinions $n\ n$, whose teeth engage with those of two equal racks $p$ formed upon the lower faces of the cross bars $d,\ d'$, of the carriage. The ways, K K, are moved equally and simultaneously toward or from the shaft of the cutting cylinder by means of a shaft O which is supported in boxes secured to the end plates, $m\ m$, of the frame, and whose opposite extremities are fitted with worms $r,\ r$, whose threads engage with those of screw wheels $s,\ s$, which are secured to the extremities of two transverse shafts $t,\ t$. These latter shafts are supported in boxes secured to the frame of the machine and are each fitted with two pinions $u,\ u$, whose teeth engage with those of racks $v\ v$ secured to the ways K K. The operation of these various feed motions is such that when the shaft O is turned the ways and the carriage upon them is moved toward or from the cutters; while by turning the shaft L the carriage is caused to slide upon the ways, transversely beneath the cutting cylinder, in such manner that the axis of the two centers is always parallel to that of the cutter.

When any prismatic objects, octagonal piano legs for example, are to be formed by this machine the cutter shaft is fitted with a set of knives which in revolving combine to describe a figure whose longitudinal sections are the counterparts of the longitudinal sections of the figure to be produced. The carriage is moved to one side of the machine by turning the shaft L, and a suitable block is selected and centered upon the carriage; the latter is then raised or depressed, by turning the shaft O, as may be required to set the centers on which the block is hung in such positions with respect to the edges of the cutters that when the centers are moved directly beneath the axis of the cutter shaft the distance from the axis of the centers to the periphery of the figure described by the cutters in rotating is equal to half the diameter of the leg to be formed. The spring catch $j$ is engaged in one notch of the ring of eight divisions on the graduated cylinder and the cutting cylinder is caused to revolve rapidly by means of a driving belt applied to a belt pulley W upon the cylinder shaft. The operator now turns the shaft L and thus causes the carriage with the block upon it to pass transversely beneath the rotating cutters; as the block comes within the range of the cutters these remove from it any surplus wood, leaving an undulating face whose transverse sections are parallel with the ways upon which the carriage is moved and whose longitudinal sections are the counterparts of the section of the figure described by the rotating cutters. The carriage is now run back to the starting point, the spring catch $j$ is disengaged from its notch, the block is turned one eighth of a revolution by turning the cylinder until the catch engages in the next notch, and the carriage is run a second time beneath the cutting cylinder by which means a second face is produced. The turning and cutting are continued alternately until the eight faces are produced as shown in the drawing.

It is evident that as the carriage is moved transversely in a straight line the transverse sections of the faces will also be straight, and the adjacent faces will meet at sharp angles. The operation may be modified by raising the carriage when the centers are exactly beneath the axis of the cutting cylinder; in which case concave faces will be produced, the exact counterparts of the cylindrical figure described by the rotating cutters.

What we claim as our invention and desire to secure by Letters Patent is—

The prismatic lathe herein described consisting essentially of a rotating cutting instrument, whose cutters in rotating combine to describe a figure whose longitudinal sections are the counterparts of the outline of the longitudinal sections of the figure to be produced, and of a carriage to hold the block in such a position that its axis is always parallel with that of the cutting instrument, and at the same time to move it transversely to the same for the purpose described and allow it to be turned on its axis at pleasure and to be held from turning while being acted upon by the cutters.

In testimony whereof we have hereunto subscribed our names.

ALLEN SHERWOOD.
AVERY BABBETT.

Witnesses:
   JAMES H. BOSTWICK,
   NORMAN PARKER.